B. B. HILL.
Thill-Coupling.
No. { 2,835, 33,839. }
Patented Dec. 3, 1861.
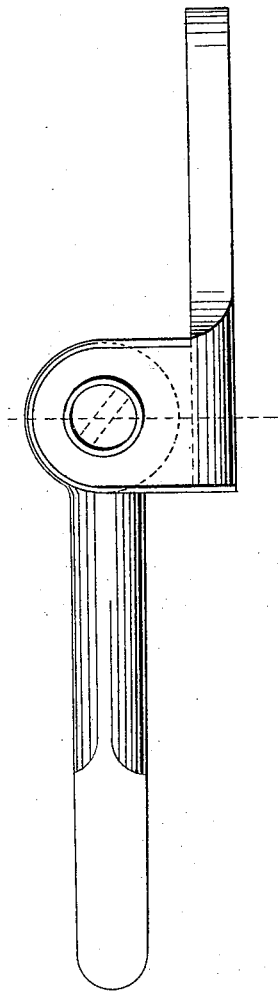
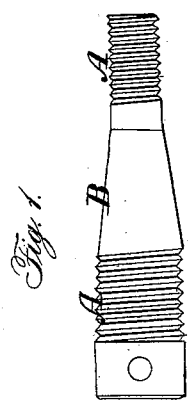
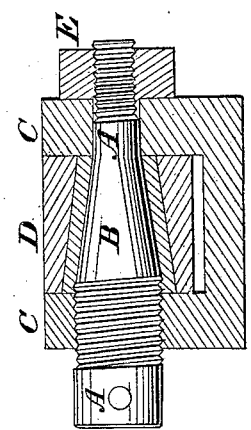
Witnesses:
B. Birge
A. L. Soule
Inventor:
Benjamin B. Hill.

UNITED STATES PATENT OFFICE.

BENJAMIN B. HILL, OF CHICOPEE, ASSIGNOR TO HIMSELF AND WILLIAM C. McCLALLAN, OF SPRINGFIELD, MASSACHUSETTS.

IMPROVEMENT IN SHAFT-COUPLINGS.

Specification forming part of Letters Patent No. 33,839, dated December 3, 1861.

*To all whom it may concern:*

Be it known that I, BENJAMIN B. HILL, of Chicopee, in the county of Hampden and State of Massachusetts, have invented a new and useful Improvement in Shaft-Couplings for Attaching the Thills or Shafts to Carriages; and I hereby declare that the following is a full and exact description thereof.

The nature of my invention consists in making the pin or bolt which passes through the jaws of the clip and the eye of the shaft-iron and fastens the shaft in its place larger at one end than the other, the part which rests in the eye at the end of the shaft-iron being tapering, the eye in the shaft-iron being also conical or tapering. The ends of the pin may be cylindrical and are threaded as screws.

To enable others skilled as mechanics to make and use my invention, I further describe it by reference to the acccompanying drawings.

Figure 1 represents the pin or bolt which holds the clip and shaft-iron together. A A are the cylindrical parts. B is the tapering part.

Fig. 2 is a sectional view of the coupling with the pin or bolt in its place. C C are the jaws of the clip. D is the end of the shaft-iron with its tapering eye, through which passes the pin or bolt A B A, secured at the smaller end by the nut E.

Fig. 3 is a side view of the coupling complete.

This coupling can be put together and taken apart with little trouble, and if it becomes loose, so that any rattling of the parts is produced, a slight turn of the pin, driving the conical or tapering part to a bearing in the eye, tightens it at once.

What I claim, and desire to secure by Letters Patent, is—

The employment of a tapering or conical bearing pin or bolt B for the socket of the shaft-iron, having an adjustable set-screw A and set-nut E, in the manner substantially as and for the purpose described.

BENJAMIN B. HILL.

Witnesses:
  B. BIRGE,
  A. L. SOULE.